April 10, 1962 G. L. WESTBY 3,028,695
HAND OPERATED DUMP CART
Filed July 10, 1959
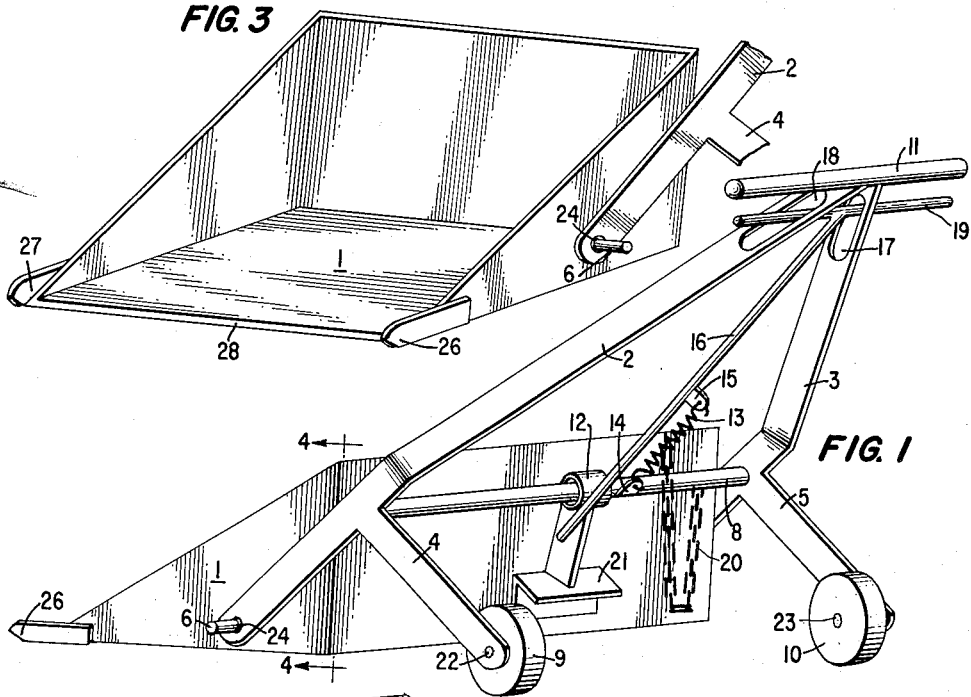
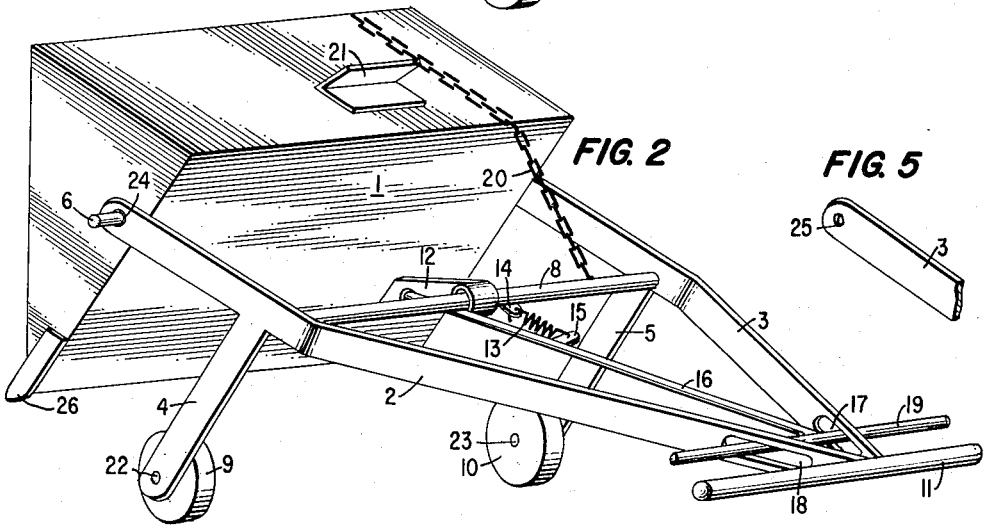
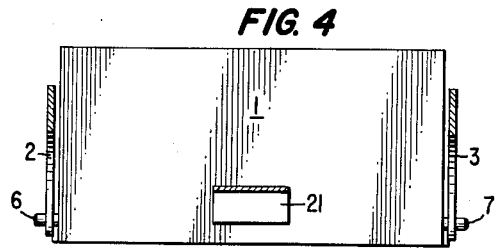
INVENTOR
Gordon L. Westby

United States Patent Office 3,028,695
Patented Apr. 10, 1962

3,028,695
HAND OPERATED DUMP CART
Gordon L. Westby, Deerfield, Wis.
Filed July 10, 1959, Ser. No. 826,247
4 Claims. (Cl. 37—130)

This invention relates to manually operated equipment used to move bulky material, such as snow, leaves, and like material, and in particular a scoop-like bucket pivotally mounted between two frame bars, these bars being in part parallel to each other and are held so by a spacing rod, to the rear of this spacing rod the frame bars are bent and brought together at the rearward ends where they are fastened to a handle, extending down from, and perpendicular to the parallel part of the aforementioned frame bars are two members to which wheels are fastened, a lock dog is hinge fastened to the spacing rod to engage a flange that extends from the rear of the bucket to lock the position of the bucket, this lock dog is spring loaded to make it self engaging, and is operated to release by a control rod that is pivotally mounted to the lock dog, this rod extends rearward to near the handle where it is formed into hand grips that are mounted to operate in slots in the frame bars, stop means are provided to control the rotation of the bucket.

It is an object of this invention to provide a means in a dump bucket to reduce the physical effort required for loading, moving, and dumping bulky material, and thereby increase manual efficiency.

It is also an object of this invention to provide in a dump cart that can be operated by simple controls in loading, moving, and dumping without transfer of the hands from the handles. Thereby maintaining constant manual stability in the operation.

Another objective is to provide a dump cart with a bucket that can be dumped by rotating it to a position that allows unobstructed gravitational dumping, except where stop means are expressly provided to control such rotation.

Other objects of novel and simple construction will be realized from study of the following description with reference to the drawing which is a part of this specification and consists of the following views.

FIGURE 1 is a perspective view of the dump cart with the bucket in the locked position, as viewed from the left rear. This position will be referred to in this specification as the normal position of the cart.

FIGURE 2 is a perspective view of the dump cart with the bucket shown in the dumped position, as viewed from the left rear.

FIGURE 3 is a perspective view of a portion of the cart showing the leading edge of the bucket as viewed from the left front.

FIGURE 4 is a rear sectional view taken on a line 4—4 of FIGURE 1.

FIGURE 5 is a perspective view of the forward portion of the right frame bar that is obstructed from view in the other figures.

This hand operated dump cart consists of a scoop-like bucket 1, studs 6 and 7 are fastened to this bucket and are located off center with the center of gravity forward and upward from the studs, these studs are inserted in holes 24 and 25 in the frame bars 2 and 3 to provide a pivotal mounting of the bucket to the frame, the bucket has guides 26 and 27 at the ends of the leading edge 28 with beveled lower edges that guide over slight ground surface obstructions.

The frame consists of two bars 2 and 3 with portions of the lower ends being mounted parallel to each other and are held so by a spacing rod 8, the opposite ends of the frame bars 2 and 3 are brought together and are fastened to the handle 11, near these ends of the frame bars 2 and 3 are elongated openings 17 and 18 which serve as keepers or guides in which the hand grip portion 19 of the control rod 16 can be operated.

The lower end of the control rod 16 is pivotally mounted to the lock dog 12 which is hinge mounted to the spacing rod 8, this lock dog engages the projecting part 21 of the bucket 1 when the bucket 1 is in the locked position as in FIGURE 1. This locking means is made self locking by spring loading the control rod 16 with an extension spring 13, this spring is fastened to a metal tab 14 that is fastened to the spacing rod 8 and the other end of this spring is fastened to a metal tab 15 that is fastened to the control rod 16.

Two bars 4 and 5 extend perpendicular from the lower side of the parallel section of the frame bars 2 and 3, and wheels 9 and 10 are mounted near the lower ends of these bars by spindles 22 and 23.

Stop means are provided to check the rotation of the bucket 1, the reverse rotation is stopped by the spacing rod 8 as in FIGURE 1, and the dumping rotation is stopped by a chain 20 or like means as in FIGURE 2, this chain 20 is fastened at one end to the bucket 1 and the other end is fastened to the spacing rod 8.

Further understanding of this invention may be realized from the following description of how the cart is operated.

With the cart in the normal position as in FIGURE 1, you grasp the handle 11 with your hands and push the cart forward, with the leading edge of the bucket scraping the ground surface, with this scraping action a layer of loose material such as snow, can be separated from the hard ground surface and is accumulated in the bucket as the forward motion progresses. When the bucket is loaded the forward motion is halted, then by pushing the handle in a downward arc the forwardly located bucket is raised in an upward arc by a prying movement with the fulcrum points at the axis of the wheels. In this position the load can be carted about, and from this raised position the load can be dumped. To actuate the dumping the lock dog is disengaged from the rearward mounted projecting flange of the bucket by squeezing the hand grip portion of the lock dog control rod in a rearward motion toward the handle, and because of the forward location of the center of gravity of the bucket, the bucket rotates and the leading edge of the bucket swings in an arc downward until the rotation is stopped by the chain like stop means provision. When the handle is again raised, the leading edge of the bucket engages the ground surface and this resistance combined with the upward movement of the handle causes the wheels to roll in a rearward direction, thus the bucket is caused to rotate to the normal position as in FIGURE 1. As the bucket rotates back to the normal position it is automatically locked by the engagement of the spring loaded lock dog with the rear mounted projecting flange of the bucket.

It will be understood that modifications within the scope of the appended claims, may be made in the design and arrangement of the parts without departing from the spirit of the invention.

What I claim is:

1. A hand operated dump cart comprising a scoop-like bucket with a scraper like leading edge, said bucket being pivotally mounted cradle like between two parallel mounted frame bars that are held thusly rigidly by a spacing rod located rearwardly of the aforementioned bucket, to the rear of this spacing rod the frame bars being bent inward and the ends brought together being attached to a handle bar, a control rod midway between the frame bars and extending from near the handle, forwardly to a pivotal mounting to a lock dog, said lock dog being hinge mounted to the aforementioned spacing rod to operate in connection with a projecting flange on the rear of the bucket, stop means to limit the rotation of the bucket when dumped, two wheels, said wheels being attached by spindles to two members respectively which extend from the lower side of and perpendicular to the parallel portion of the aforementioned frame bars.

2. A hand operated dump cart as in claim 1, wherein said scoop-like bucket has two mounting studs fastened to the sides thereof said studs being below and to the rear of the center of gravity of the bucket when mounted, said frame bars having openings in and near the ends thereof to receive said aforementioned studs in a pivotal cradle like mounting to allow unrestricted rotation to an over turned dumping position.

3. A hand operated dump cart as in claim 1 wherein the lock dog is hinge mounted and spring loaded to be forced against spring tension by a cam action on contact of the projecting flange on the rear of the bucket when the bucket is rotated from a dumped position to a loading position said flange being movable into automatic locking engagement with the spring loaded lock dog at the end of this cam stroke.

4. A hand operated dump cart as in claim 1 wherein said control rod is mounted loosely between the bent in portion of the aforementioned frame bars, said control rod having a T section end for hand grips that are operative in elongated openings in the frame bars near the handle cross bar, this simple mounting arrangement limiting the sidewise movement of the control rod as well as the twisting of the T section from the horizontal.

References Cited in the file of this patent

UNITED STATES PATENTS

| | | |
|---|---|---|
| 1,742,485 | Parsons | Jan. 7, 1930 |
| 2,546,030 | Grewe | Mar. 20, 1951 |
| 2,766,063 | Greelez | Oct. 9, 1956 |

FOREIGN PATENTS

| | | |
|---|---|---|
| 771,506 | France | July 30, 1934 |
| 67,531 | Denmark | Aug. 16, 1948 |
| 666,141 | Great Britain | Feb. 6, 1952 |